(12) United States Patent
Inami et al.

(10) Patent No.: US 10,647,298 B2
(45) Date of Patent: May 12, 2020

(54) VALET KEY CONTROL SYSTEM AND VALET KEY

(71) Applicant: KABUSHIKI KAISHA TOKAI RIKA DENKI SEISAKUSHO, Aichi (JP)

(72) Inventors: Yuichi Inami, Aichi (JP); Masahiko Oya, Aichi (JP); Masahiro Arakawa, Aichi (JP); Yutaka Kubo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/182,000

(22) Filed: Nov. 6, 2018

(65) Prior Publication Data

US 2019/0143941 A1 May 16, 2019

(30) Foreign Application Priority Data

Nov. 14, 2017 (JP) ................................. 2017-219257

(51) Int. Cl.
  *B60R 25/24* (2013.01)
  *H04L 9/08* (2006.01)
  *B60R 25/01* (2013.01)

(52) U.S. Cl.
  CPC ............ *B60R 25/241* (2013.01); *B60R 25/01* (2013.01); *H04L 9/0819* (2013.01); *B60R 2325/205* (2013.01)

(58) Field of Classification Search
  CPC .............................. H04L 9/0819; B60R 25/01
  USPC ......................................................... 340/5.28
  See application file for complete search history.

(56) References Cited

U.S. PATENT DOCUMENTS

| | | | |
|---|---|---|---|
| 2001/0028295 A1* | 10/2001 | Brinkmeyer | B60R 25/04 340/5.25 |
| 2003/0146820 A1* | 8/2003 | Takamura | B60R 25/24 340/5.28 |
| 2014/0277837 A1* | 9/2014 | Hatton | B60R 25/24 701/2 |
| 2017/0186251 A1* | 6/2017 | Lee | G07C 9/00007 |

FOREIGN PATENT DOCUMENTS

JP 2006-225976 A 8/2006

* cited by examiner

*Primary Examiner* — Fabricio R Murillo Garcia
(74) *Attorney, Agent, or Firm* — Greenblum & Bernstein, P.L.C.

(57) ABSTRACT

A valet key control system includes a time monitoring unit and a communication subject setting unit. The time monitoring unit is configured to monitor a remaining time of a reserved period during which the valet key is allowed to be used as the vehicle key. The communication subject setting unit is configured to set a communication subject of the valet key in accordance with the remaining time of the reserved period.

5 Claims, 4 Drawing Sheets

VALET KEY CONTROL SYSTEM AND VALET KEY

CROSS-REFERENCE TO RELATED APPLICATIONS

This application is based upon and claims the benefit of priority from prior Japanese Patent Application No. 2017-219257, filed on Nov. 14, 2017, the entire contents of which are incorporated herein by reference.

FIELD

This disclosure relates to a valet key used as a vehicle key when lending a vehicle to a third person and a valet key control system that controls a valet key.

BACKGROUND

Japanese Laid-Open Patent Publication No. 2006-225976 discloses an electronic key system applicable to, for example, valet parking service in which a user lends the vehicle to a third person such as a valet. In such type of valet parking service, for example, the user hands a dedicated valet key to the third person in order to have the vehicle parked at a certain parking spot.

SUMMARY

In car sharing service, a vehicle may be used (shared) by a number of people each employing a mobile terminal, such as a smartphone, as an electronic key (vehicle key). In this case, for example, key information is registered to the mobile terminal to allow the mobile terminal to be used as the vehicle key. However, for example, when using valet parking serving with such a share vehicle, the user will hesitate to hand his or her mobile terminal to a third person. The user would rather prefer to hand a separate valet key to the third person.

In such type of a car sharing system, the use of the valet key may be permitted for only a limited period of time. For example, key information including the reserved period may be registered to the valet key so the valet key can be used only within the reserved period. In this case, however, if the user forgets when the reserved period ends, the user may become confused when he or she suddenly cannot use the valet key.

One embodiment is a valet key control system that controls a valet key usable as a vehicle key when lending a vehicle to a third person. The valet key control system includes a time monitoring unit and a communication subject setting unit. The time monitoring unit is configured to monitor a remaining time of a reserved period during which the valet key is allowed to be used as the vehicle key. The communication subject setting unit is configured to set a communication subject of the valet key in accordance with the remaining time of the reserved period.

Another embodiment is a valet key usable as a vehicle key when lending a vehicle to a third person. The valet key includes a time monitoring unit and a communication subject setting unit. The time monitoring unit is configured to monitor a remaining time of a reserved period during which the valet key is allowed to be used as the vehicle key. The communication subject setting unit is configured to set a communication subject of the valet key in accordance with the remaining time of the reserved period.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a valet key control system and a valet key will now be described with reference to FIGS. 1 to 5.

Figure 1:
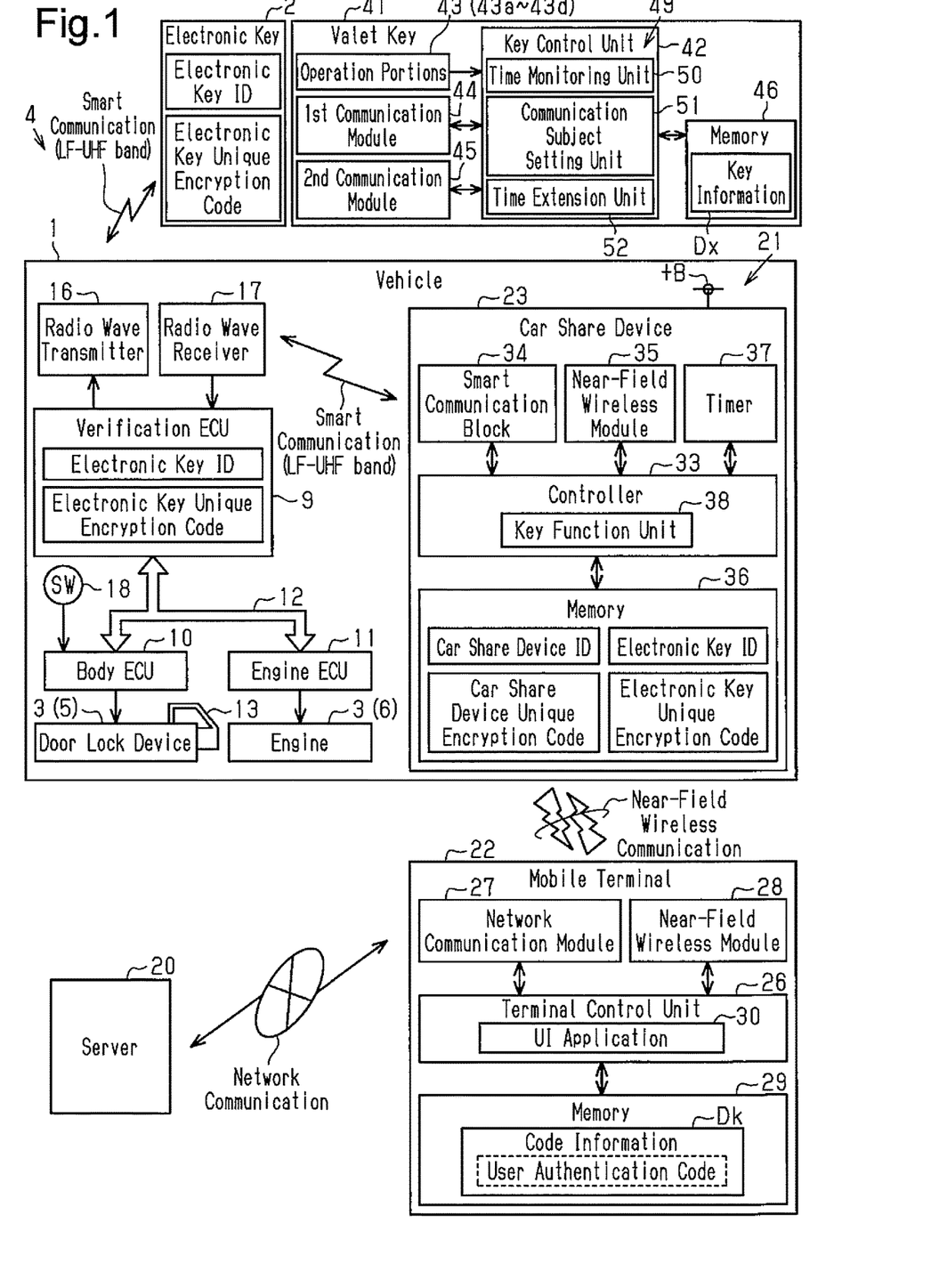
FIG. 1 is a schematic block diagram illustrating one embodiment of a car sharing system and a valet key control system.

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 actuates or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may be, for example, a door lock device 5 or an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response verification that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. If interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server 20 is registered to the mobile terminal 22. When the code information Dk is registered to the mobile terminal 22, the mobile terminal 22 is associated with the vehicle 1 (car share device 23). The car share device 23 obtains the code information Dk from the mobile terminal 22 and authenticates the code information Dk. In the present example, the car share device 23 includes an encryption code (car share device unique encryption code) configured to decode the code information Dk. The code information Dk is authenticated when decoded. After the authentication process is accomplished, the car share device 23 accepts requests from the mobile terminal 22 for actuating the on-board device 3. The mobile terminal 22 may be, for example, a smartphone. Preferably, the code information Dk is, for example, a one-time key (one-time password) that can be used only once.

The car share device 23 is independent from the hardware configuration of the electronic key system 4 and can be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery +B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to establish network communication between the mobile terminal 22 and an external device such as the server 20. The near-field wireless communication module 28 is used to establish near-field wireless communication between the mobile terminal 22 and the car share device 23. The memory 29 is a data rewritable memory. The mobile terminal 22 obtains the code information Dk from the server 20 with the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from the server 20 and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be included in, for example, the code information Dk. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code is stored in the server 20. The mobile terminal 22 may obtain the code information Dk, which is encrypted by the car share device unique encryption code, from the server 20. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more commands. The one or more processors execute commands so that the controller 33 functions as the key function unit 38. The key function unit 38 obtains the code information Dk from the mobile terminal 22 and authenticates the code information Dk. When authentication of the code information Dk is accomplished in a normal manner, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

Figure 2:
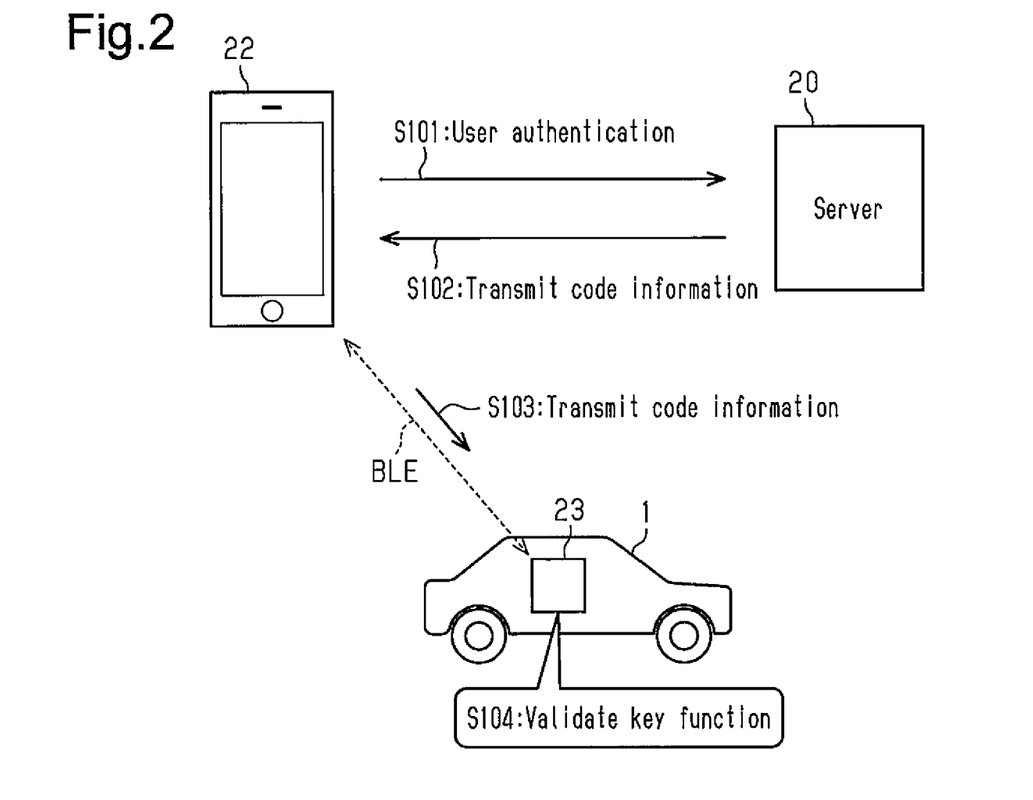
FIG. 2 is a diagram illustrating the communication sequence for code information authentication.

FIG. 2 illustrates an example of a communication sequence for code information authentication. When reserving the vehicle 1 with the car sharing system 21, code information authentication is performed in accordance with the communication sequence of FIG. 2. In step S101, the server 20 authenticates the user of the mobile terminal 22 (user reserving vehicle 1) through network communication with the mobile terminal 22 (the UI application 30). For example, user authentication is performed with a user ID and password that are input to the mobile terminal 22 (UI application 30). In the user authentication, a usage reservation procedure is performed to register reservation information of the vehicle 1. The reservation information of the vehicle 1 includes, for example, the reserved vehicle and the reserved date and time. After the server 20 authenticates the user with the user ID and the password, the process proceeds to step S102. If user authentication is not accomplished, the process is forcibly terminated.

In step S102, the server 20 generates the code information Dk and transmits the code information Dk to the mobile terminal 22 through network communication. For example, the car share device unique encryption code of the car share device 23, which is installed in the vehicle 1 (reserved vehicle), may be registered to the server 20. The server 20 may generate the code information Dk using the car share device unique encryption code. For example, the server 20 uses an encryption expression (encryption algorithm) to encrypt plain text with the car share device unique encryption code and use the encrypted text as the code information Dk. The encrypted plain text may include, for example, the reserved date and time of the vehicle 1, a terminal ID unique to the mobile terminal 22, and the user authentication code used as an encryption code for establishing encrypted communication between the mobile terminal 22 and the car share device 23.

In step S103, the mobile terminal 22 establishes near-field wireless communication (in the present example, BLE communication) with the car share device 23 and transmits the code information Dk to the car share device 23 of the vehicle 1. For example, the Bluetooth function is validated to establish BLE communication. When receiving the car share device unique encryption code, the car share device 23 authenticates the code information Dk. In the present example, the car share device 23 uses the car share device unique encryption code to decode the code information Dk. When decoding of the code information Dk is accomplished, the car share device 23 determines that the code information Dk has been correctly received from the mobile terminal 22. When authentication is accomplished, the car share device 23 extracts the reservation date and time, the terminal ID, and the user authentication code.

When authentication of the code information Dk is accomplished, in step S104, the car share device 23 switches the electronic key function (key function unit 38) from an invalid state to a valid state. This allows the car share device 23 (key function unit 38) to execute electronic key ID verification through LF-UHF bidirectional communication with the verification ECU 9. In the present example, the car share device 23 stores the code information Dk (e.g., user authentication code) in the memory 36. After the code information Dk, which includes the user authentication code, is stored in the memory 36, the mobile terminal 22 and the car share device 23 both shift to an authentication completion state. This allows the mobile terminal 22 to be used in place of the electronic key 2 as an electronic key (vehicle key) of the vehicle 1.

Figure 3:
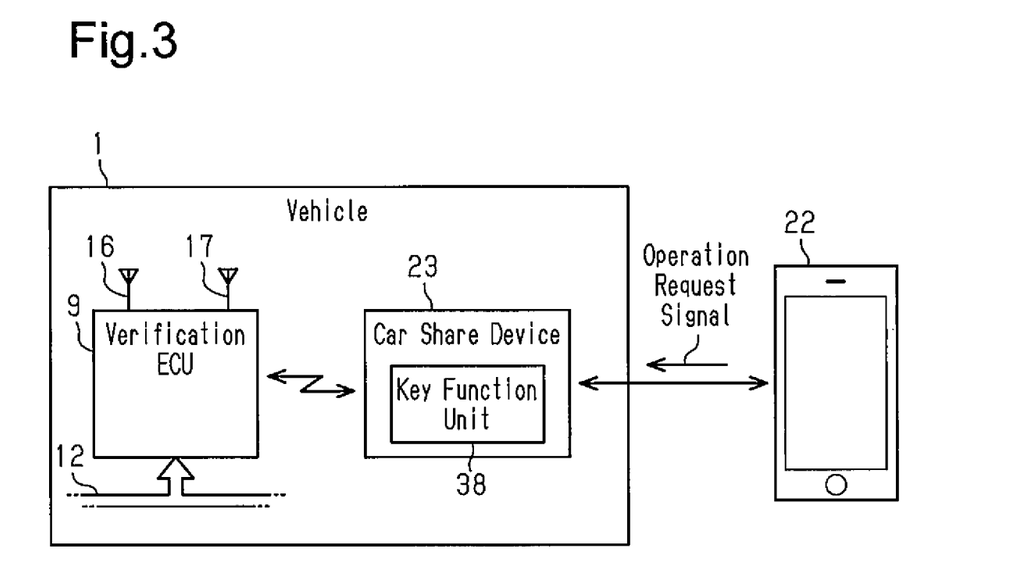
FIG. 3 is a diagram illustrating an example of a case in which a vehicle is operated with a mobile terminal.

Referring to FIG. 3, the user operates and activates an operation request button of the mobile terminal 22, which has been shifted to the authentication completion state, to transmit an operation request signal from the mobile terminal 22 to the car share device 23. The operation request button is, for example, shown on a display of the mobile terminal 22, and used to actuate the on-board device 3. The operation request button may be, for example, an unlock request button for unlocking the vehicle door 13, a lock request button for locking the vehicle door 13, an engine start button for starting the engine 6, or the like.

The UI application 30 of the mobile terminal 22 encrypts an operation request signal, which corresponds to the operation request button, with the user authentication code. In a non-restrictive example, the operation request signal may include a device actuation command corresponding to the operation request button. The UI application 30 of the mobile terminal 22 transmits the encrypted operation request signal to the car share device 23.

When the car share device 23 receives the operation request signal, the car share device 23 communicates with the verification ECU 9 of the electronic key system 4 and actuates the on-board device 3 in accordance with the received operation request signal. In a non-restrictive example, the car share device 23 establishes smart communication with the verification ECU 9 of the electronic key system 4 through the smart communication block 34 and sends a device actuation command and the electronic key ID to the verification ECU 9. The verification ECU 9 performs electronic key ID verification and sends the device actuation command to the ECU of the corresponding on-board device when the electronic key ID verification is accomplished to actuate the corresponding on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In the same manner as the smart verification performed between the electronic key 2 and the verification ECU 9, smart verification may be performed between the car share device 23 and the verification ECU 9.

Returning to FIG. 1, the car sharing system 21 is applicable to a valet parking system for lending the vehicle 1 to a valet (i.e., asking for the vehicle to be parked). In the present example, when lending the vehicle 1 to a third person such as a valet, a valet key 41 is handed to the third person as the vehicle key (electronic key).

The valet key 41 includes a key control unit 42, operation portions 43, a first communication module 44, a second communication module 45, and a memory 46. The key control unit 42 controls the operation of the valet key 41. The operation portions 43 are used when the user operates the valet key 41. The first communication module 44 is used for wireless communication (in present example, Bluetooth communication) between the mobile terminal 22 and the valet key 41. The second communication module 45 is used for wireless communication (in the present example, Bluetooth communication) between the vehicle 1 (in the present example, the car share device 23) and the valet key 41. The memory 36 is, for example, a data rewritable memory and stores key information Dx. The key information Dx may be, for example, the code information Dk or the user authentication code.

The key information Dx is registered to the memory 46 to allow the valet key 41 to function as the vehicle key (electronic key) of the vehicle 1. In a non-restrictive example, the registration of the key information Dx to the valet key 41 is performed by requesting for the key information Dx from the valet key 41 via the mobile terminal 22 to the server 20 and obtaining the key information Dx from the server 20. Alternatively, the valet key 41 may directly obtain the key information Dx from the server 20.

If the key information Dx that is to be registered to the valet key 41 has already been stored in the mobile terminal 22, the valet key 41 may acquire the key information Dx from the mobile terminal 22 instead of acquiring new key information Dx from the server 20. For example, the mobile terminal 22 acquires the key information Dx for the valet key 41 together with the code information Dk from the server 20. In this case, there is no need for communication to be performed between the server 20 and the mobile terminal 22. This facilitates the registration of the key information Dx to the valet key 41.

In a non-restrictive example, the operation portions 43 include a lock operation portion 43a, which is operated the vehicle door 13, and an unlock operation portion 43b, which is operated to unlock the vehicle door 13. In the present example, the operation portions 43 further include a first operation portion 43c operated to initiate use of the valet key 41 (car sharing system 21) and a second operation portion 43d operated to terminate use of the valet key 41 (car sharing system 21). The operation portions 43a to 43d may be, for example, push buttons. The first operation portion 43c may be used, for example, when initiating near-distance wireless communication (Bluetooth communication) with the valet key 41. When use of the valet key 41 is initiated, the vehicle 1 can be used with the valet key 41. When use of the valet key 41 is terminated, the key function of the valet key 41 is invalidated and the vehicle 1 thereby cannot be used with the valet key 41.

The valet key 41 includes a valet key control system 49. The valet key control system 49 of the present example is used together with the car sharing system 21. However, the valet key control system 49 does not necessarily have to be used together with the car sharing system 21. The valet key 41 (valet key control system 49) includes a communication subject switching function that changes the communication subject of the valet key 41 in accordance with the remaining time of the reserved period during which the valet key 41 is allowed to be used. The valet key 41 monitors the remaining time of the reserved period. When the remaining time of the reserved period is sufficient, the valet key 41 sets the communication subject to the vehicle 1 so that the vehicle 1 (on-board device 3) can be actuated by operating the valet key 41. When the remaining time of the reserved period is zero (0) or close to zero, the valet key 41 switches the communication subject of the valet key 41 to the mobile terminal 22 to request for extension of the reserved period to the mobile terminal 22 through communication with the mobile terminal 22 so that the valet key 41 can be continuously used after the reserved period ends.

In the present example, the valet key 41 (valet key control system 49) includes a time monitoring unit 50 that measures and monitors the remaining time of the reserved period during which the valet key 41 can be used to actuate the vehicle 1, that is, the remaining time during which the valet key 41 is allowed to be used as the vehicle key. The time monitoring unit 50 is arranged in the key control unit 42 of the valet key 41. For example, the valet key 41 includes one or more processors and a memory storing one or more commands. The one or more processors execute commands so that the key control unit 42 functions as the time monitoring unit 50.

In a non-restrictive example, the valet key 41 transmits the code information Dk, which is stored in the memory 46 as the key information Dx, to the car share device 23 of the vehicle 1. The car share device 23 decodes the code information Dk to acquire the reserved period (reserved date and time) from the code information Dk and notifies the valet key 41 of the acquired reserved period (or currently remaining time of reserved period). Then, the time monitoring unit 50 measures and monitors the remaining time of the reserved period.

Further, the valet key 41 (valet key control system 49) includes a communication subject setting unit 51 that sets the communication subject of the valet key 41 in accordance with the remaining time of the reserved period for the valet key 41. The communication subject setting unit 51 is arranged in the key control unit 42 of the valet key 41. For example, the one or more processors of the valet key 41 execute commands to have the key control unit 42 function as the communication subject setting unit 51.

When the remaining time of the reserved period is zero (0) or close to zero, the communication subject setting unit 51 sets the communication subject of the valet key 41 to the mobile terminal 22 that is allowed to be used as the vehicle key. For example, when the remaining time of the reserved period is shorter than a first threshold time, the communication subject setting unit 51 may set the communication subject of the valet key 41 to the mobile terminal 22. When the remaining time of the reserved period is still sufficient, the communication subject setting unit 51 sets the communication subject of the valet key 41 to the vehicle 1 (in the present example, car share device 23). For example, when the remaining time of the reserved period is longer than or equal to a second threshold time, the communication subject setting unit 51 may set the communication subject of the valet key 41 to the car share device 23. The second threshold time may be equal to the first threshold time or longer than the first threshold time.

For example, at the beginning of the reserved period when the remaining time of the reserved period is greater than or equal to the second threshold time, the communication subject setting unit 51 sets the communication subject of the valet key 41 to the car share device 23. Afterwards, the communication subject setting unit 51 does not change the communication subject of the valet key 41 until the remaining time of the reserved period becomes shorter than the first threshold time. When the remaining time of the reserved period becomes shorter than the first threshold time, the communication subject setting unit 51 switches the communication subject of the valet key 41 from the car share device 23 to the mobile terminal 22.

Further, the valet key 41 (valet key control system 49) includes a time extension unit 52 that extends the reserved period. The time extension unit 52 is arranged in the key control unit 42 of the valet key 41. For example, the one or more processors of the valet key 41 execute commands so that the key control unit 42 functions as the time extension unit 52. In the present example, the valet key 41 transmits a request for extension of the reserved period to the mobile terminal 22 and acquires new code information Dk from the server 20 via the mobile terminal 22 to extend the remaining time period. As described above, when the remaining time of the reserved period is zero or close to zero, the communication subject setting unit 51 sets the communication subject of the valet key 41 to the mobile terminal 22. When the communication subject is set to the mobile terminal 22 in such a manner, the time extension unit 52 executes a process for extending the reserved period of the valet key 41.

The operation of the valet key control system 49 will now be described with reference to FIGS. 4 and 5.

Figure 4:
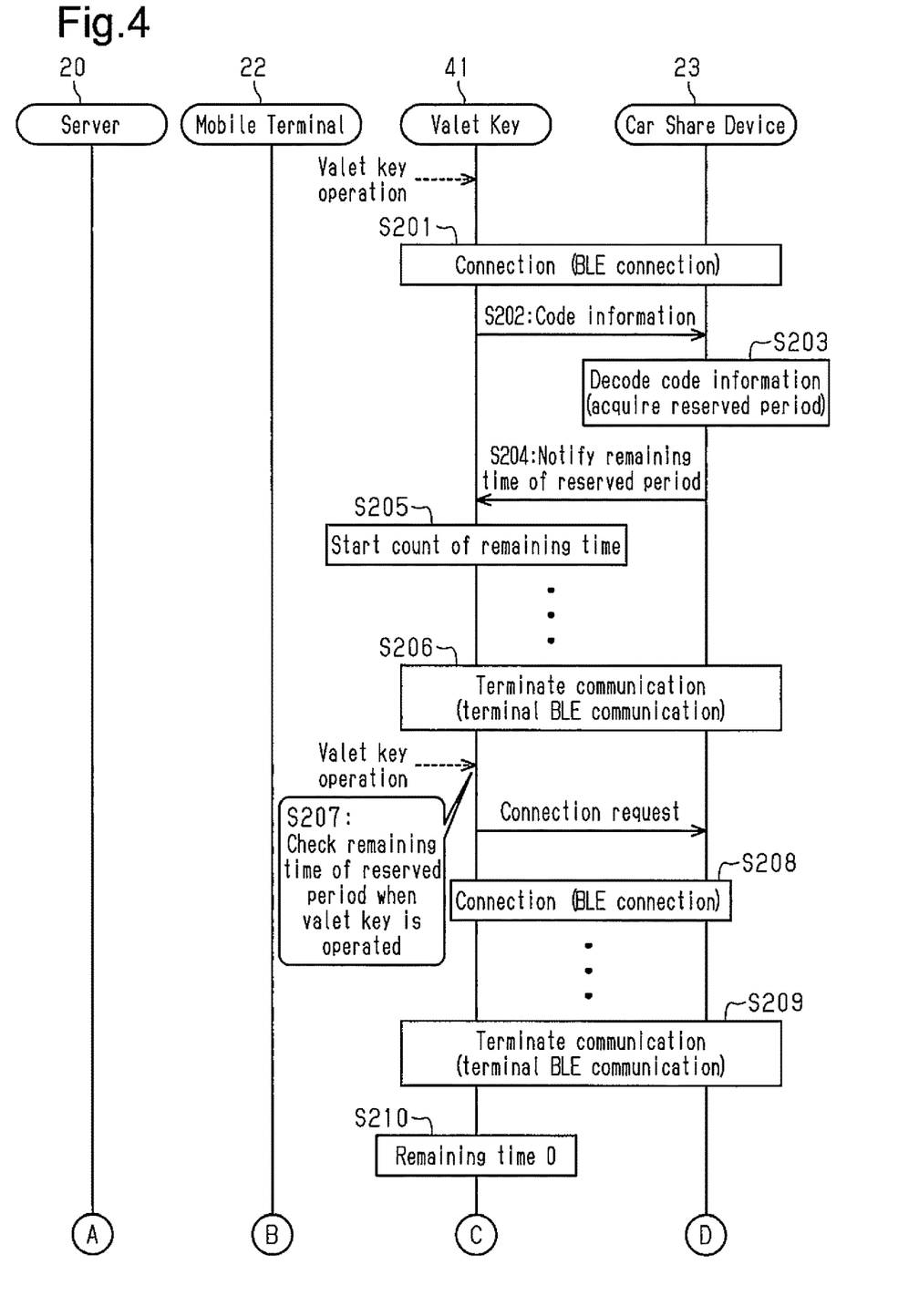
FIG. 4 is a flowchart illustrating an example of a process for switching a communication subject of a valet key and extending the reserved period.

Referring to FIG. 4, when the valet key 41 to which the key information Dx has been registered is operated, in step S201, the valet key 41 (e.g., UI application of valet key 41) is connected through near-field wireless communication to the car share device 23. In the present example, the key information Dx, which is registered to the valet key 41, is the code information Dk. When the first operation portion 43c of the valet key 41 is operated, the valet key 41 is BLE-connected via the second communication module 45 to the car share device 23. In the BLE connecting process, the valet key 41, for example, cyclically receives advising packets from the car share device 23 and transmits a communication connection request to the car share device 23. When the car share device 23 receives the communication connection request, BLE communication is initiated between the car share device 23 and the valet key 41.

In step S202, the valet key 41 (UI application of valet key 41) transmits the code information Dk, which is registered to the valet key 41, to the car share device 23. The transmission of the code information Dk to the car share device 23 is performed when the valet key 41 is used for the first time.

In step S203, the car share device 23 authenticates the code information Dk. In the present example, the car share device 23 uses a certain encryption code (e.g., car share device unique encryption code) to decode the code information Dk. When decoding of the code information Dk is accomplished, the code information Dk is authenticated. Further, the car share device 23 acquires the reserved period (i.e., reserved date and time) from the code information Dk. In this manner, authentication of the code information Dk allows the valet key 41 to be used as the vehicle key of the vehicle 1. When acquiring the reserved period from the code information Dk, the car share device 23 acquires the currently remaining time of the reserved period by referring to the timer 37.

In step S204, the car share device 23 notifies the valet key 41 of the remaining time of the reserved period. In step S205, the valet key 41 (UI application of valet key 41) starts measuring the remaining time of the reserved period. For example, the time monitoring unit 50 may set the value of a timer (hardware timer or software timer) of the valet key 41 to the current remaining time of the reserved period and measure the remaining time of the reserved period based on the value of the timer.

Subsequently, when use of the vehicle 1 with the valet key 41 ends, in step S206, the valet key 41 (UI application of valet key 41) terminates BLE communication with the car share device 23.

In step S207, the valet key 41 (e.g., first operation portion 43c) may be operated again. In such a case, the time monitoring unit 50 checks the current remaining time of the reserved period. When the remaining time of the reserved period is sufficient (e.g., longer than or equal to second threshold time), the communication subject setting unit 51 sets the communication subject of the valet key 41 to the car share device 23 of the vehicle 1. Then, in the same manner as step S201, the valet key 41 transmits a communication connection request via the second communication module 45 to the car share device 23.

In step S208, when the car share device 23 receives the communication connection request from the valet key 41, BLE communication is established between the valet key 41 and the car share device 23. This allows the valet key 41 to be used as the vehicle key, and the vehicle 1 can be actuated by operating the valet key 41.

Subsequently, when use of the vehicle 1 with the valet key 41 ends, in step S209, the valet key 41 (UI application of valet key 41) terminates BLE communication with the car share device 23.

In step S201, the remaining time of the reserved period becomes zero (in the present example, timer value of valet key 41 becomes zero).

Figure 5:
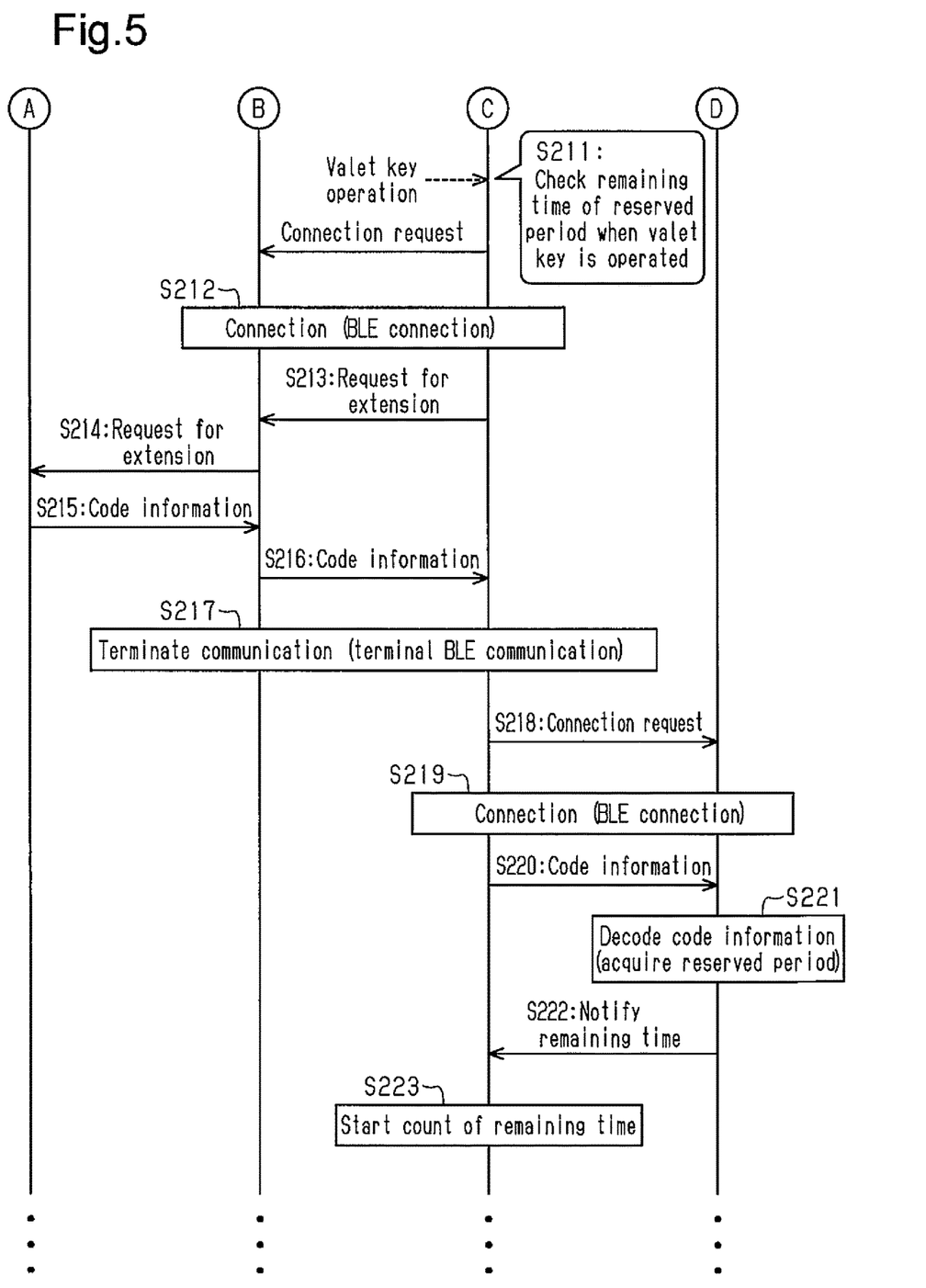
FIG. 5 is a flowchart that continues from the flowchart of FIG. 4.

Referring to FIG. 5, in step S211, the valet key 41 (e.g., first operation portion 43c) may be operated again. In such a case, the time monitoring unit 50 checks the current remaining time of the reserved period. For example, the time monitoring unit 50 determines whether or not the remaining time of the reserved period is shorter than the first threshold time. In this case, the time monitoring unit 50 determines that the remaining time of the reserved period is zero. Thus, the communication subject setting unit 51 switches the communication subject of the valet key 41 from the car share device 23 to the mobile terminal 22. Accordingly, the valet key 41 transmits a communication connection request via the first communication module 44 to the mobile terminal 22.

In step S212, when the mobile terminal 22 receives the communication connection request from the valet key 41, BLE communication is established between the valet key 41 and the mobile terminal 22.

In step S213, the time extension unit 52 of the valet key 41 transmits a request for extension of the reserved period to the mobile terminal 22. The requested extension time is not limited to a predetermined time (e.g., ten or twenty minutes) and may be, for example, a designated time input by the user.

In step S214, the mobile terminal 22 transmits the request for extension from the valet key 41 to the server 20 through network communication.

In step S215, the server 20 generates new code information Dk in response to the request for extension from the mobile terminal 22 and transmits the new code information Dk to the mobile terminal 22. For example, the new code information Dk may include the new reserved period (extended time) designated by the request for extension, the terminal ID, and a new user authentication code.

In step S216, the mobile terminal 22 transmits the new code information Dk to the valet key 41.

When the time extension unit 52 (valet key 41) acquires the new code information Dk, in step S217, BLE communication is terminated between the valet key 41 and the mobile terminal 22. In this manner, when the new code information Dk is acquired by the valet key 41, the reserved period is extended. This allows the valet key 41 to be continuously used as the vehicle key.

In step S218, the valet key 41 transmits a connection request for BLE communication to the car share device 23. In step S219, BLE communication is initiated between the valet key 41 and the car share device 23.

In step S220, the valet key 41 transmits the new code information Dk to the car share device 23. In step S221, the car share device 23 acquires (decodes) the new code information Dk to acquire the new reserved period in the same manner as step S203. Then, steps S222 and S223 are performed in the same manner as step S204 and S205. Consequently, based on the new reserved period, the remaining time of the reserved period is measured and monitored, and the valet key 41 is allowed to be continuously used as the vehicle key.

The valet key 41 (valet key control system 49) pf the present embodiment has the advantages described below.

The valet key 41 (valet key control system 49) includes the time monitoring unit 50, which monitors the remaining time of the reserved period during which the valet key 41 is allowed to be used, and the communication subject setting unit 51, which sets the communication subject of the valet key 41 in accordance with the remaining time of the reserved period. The communication subject of the valet key 41 is automatically set in accordance with the remaining time of the reserved period. Thus, there is no need for the user to be concerned of the remaining time of the reserved period. Further, the valet key 41 performs the actions required to select the proper communication subject in accordance with the remaining time of the reserved period. This improves convenience for the user using the valet key 41. More specifically, the communication subject of the valet key 41 is switched in accordance with the remaining time of the reserved period. Thus, there is no need for the user to perform an operation for switching the communication subject.

The valet key 41 (valet key control system 49) further includes the time extension unit 52 that executes a process for extending the reserved period. When the remaining time of the reserved period is zero or close to zero, the communication subject setting unit 51 sets the communication subject of the valet key 41 to the mobile terminal 22. When the communication subject of the valet key 41 is set to the mobile terminal 22, the time extension unit 52 transmits a request for extension of the reserved period to the mobile terminal 22 so that the valet key 41 can be continuously used after the reserved period ends.

Accordingly, even after the reserved period of the valet key 41 ends, the valet key 41 is allowed to be used as the vehicle key. In this case, there is no need for the user to perform any special operation. For example, when the user operates an operation portion 43 of the valet key 41 after the reserved period of the valet key 41 ends, the communication subject setting unit 51 automatically sets the communication subject of the valet key 41 to the mobile terminal 22 and executes a process for extending the reserved period of the time extension unit 52 (refer to steps S211 to S216 of FIG. 5). Accordingly, the user can extend the reserved period by operating the valet key 41 as usual. This improves convenience for the user using the valet key 41. In this case, a message indicating extension of the reserved period may be shown on the mobile terminal 22. This allows the user to continue use of the valet key 41 while recognizing that the reserved period has ended.

The valet key 41 is suitable for use with the vehicle 1 included in the car sharing system 21. In the car sharing system 21, the mobile terminal 22 is used as the vehicle key to operate the vehicle 1. When using valet parking service with the car sharing system 21, the user does not have to hand the mobile terminal 22 to a third person. The user hands the valet key 41 to the third person. The valet key 41 is seldom used, and the user may not be familiar with how to use the valet key 41. Thus, if the user forgets the remaining time of the reserved period, the reserved period may end when using the valet key 41. In the present example, even if the remaining time of the reserved period is short, the valet key 41 performs the actions required to select the communication subject in accordance with the remaining time of the reserved period. Thus, even if the reserved period has ended, the reserved period of the communication subject can be extended. This improves convenience for the user using the valet key 41.

The vehicle 1 of the car sharing system 21 is not limited to a typical commercial vehicle and may be an automobile shared by a group such as a family. In this case, for example, if a family member (family user) other than the main user, who is the owner of the vehicle 1, uses the vehicle 1, a vehicle usage request is transmitted from the mobile terminal 22 of the family user to the mobile terminal 22 of the main user. When the mobile terminal 22 of the main user receives the vehicle usage request and the main user operates the mobile terminal 22 to permit use of the vehicle 1, the mobile terminal 22 of the main user transmits usage permission to the mobile terminal 22 of the family user.

After the usage permission is transmitted to the mobile terminal 22 of the family user, the mobile terminal 22 of the family user (or mobile terminal 22 of main user) acquires the code information Dk from the server 20 and registers the code information Dk to the mobile terminal 22 of the family user. For example, the server 20 generates the code information Dk that is registered to the mobile terminal 22 of the family user and transmits the code information Dk to the mobile terminal 22 through network communication. The code information Dk may include a reservation time and date, a terminal ID of the mobile terminal 22 of the family user, and user authentication code registered to the mobile terminal 22 of the family user. Preferably, the code information Dk is transmitted as encrypted data from the server 20 to the mobile terminal 22 of the family user.

When receiving the code information Dk from the server 20, the mobile terminal 22 of the family user writes the code information Dk to the memory 29. As a result, the mobile terminal 22 of the family user becomes operable as the vehicle key. In this manner, the vehicle 1 can be shared by members of a group such as a family.

It should be apparent to those skilled in the art that the foregoing embodiments may be implemented in many other specific forms without departing from the scope of this disclosure. Particularly, it should be understood that the foregoing embodiments may be implemented in the following forms.

In the above embodiment, when extending the reserved time, the valet key 41 transmits a request for extension to the mobile terminal 22. However, the valet key 41 may not be able to find the mobile terminal 22. In such a case, the valet key 41 may directly communicate with the server 20 and directly acquire new code information Dk from the server 20.

In the above embodiment, in response to the notification of the remaining time of the reserved period from the car share device 23, the valet key 41 measures and monitors the remaining time of the reserved period. Instead, the valet key 41 may measure and monitor the remaining time of the reserved period in response to a notification of the reserved period from the car share device 23.

In the above embodiment, when the valet key 41 sends a request for extension of the reserved period via the mobile terminal 22 to the server 20, the server 20 generates new code information Dk to extend the reserved period. Instead, the valet key 41 may, for example, reacquire the code information Dk from the mobile terminal 22 to extend the reserved period.

The communication subject of the valet key 41 is not limited to the mobile terminal 22 and the car share device 23 (vehicle 1) and may be any other device or terminal.

New code information Dk does not necessarily have to be acquired to extend the reserved period. For example, instead of acquiring the code information Dk, the valet key 41 may extend the reserved period upon receipt of an extension permission from the mobile terminal 22 (or server 20) when the reserved period is zero or close to zero.

Communication between the mobile terminal 22 and the valet key 41 is not limited to Bluetooth communication and may be another communication protocol.

In the valet key 41, the first communication module 44 and the second communication module 45 do not have to be configured as separate module components and may be configured as a single module component.

The valet key 41 is not limited to the configuration of the above embodiment and may have any configuration.

The mobile terminal 22, the car share device 23, and the valet key 41 may acquire the user authentication code through any procedure or process.

The code information Dk does not have to be encrypted by the car share device unique encryption code and may be encrypted by any other encryption code.

The content of the code information Dk can be changed to one other than that of the above embodiment.

The code information Dk does not have to be generated by the server 20 and may be generated by any other external device.

The condition for switching the key function unit 38 from an invalid state to a valid state is not limited to the condition described above and may be any other condition.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response verification. As long as electronic key ID verification is performed, any verification process may be performed. Further, any verification may be performed in lieu of the challenge-response verification.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 can be installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A valet key control system that controls a valet key usable as a vehicle key when lending a vehicle to a third person, the valet key control system comprising:

a time monitor that monitors a remaining time of a reserved period during which the valet key is allowed to be used as the vehicle key; and a communication subject setter that switches a communication subject of the valet key between the vehicle and a mobile terminal, differing from the valet key, of a user of the vehicle in accordance with the remaining time of the reserved period, wherein when the remaining time of the reserved period is shorter than a threshold time, the communication subject setter sets the communication subject of the valet key to the mobile terminal to obtain permission to allow the valet key to be continuously used after the reserved period ends from the mobile terminal or an external device that communicates the mobile terminal, and wherein when the remaining time of the reserved period is greater than or equal to the threshold time, the valet key is allowed to be used as the vehicle key.

2. The valet key control system according to claim 1, further comprising a time extension processor that extends the reserved period of the valet key, wherein the communication subject setter sets the communication subject of the valet key to the mobile terminal when the remaining time of the reserved period is zero or close to zero, wherein the mobile terminal is allowed to be used as the vehicle key, and the time extension processor, in response to the communication subject of the valet key being set to the mobile terminal, transmits a request for extension of the reserved period to the mobile terminal or the external device via the mobile terminal to request for permission of extension of the reserved period so as to allow the valet key to be continuously used after the reserved period ends.

3. The valet key control system according to claim 2, wherein the time extension processor sends the request for extension of the reserved period via the mobile terminal to the external device, wherein the request for extension includes designating a new reserved period to extend the reserved period.

4. The valet key control system according to claim 1, wherein the valet key is used in a car sharing system including the vehicle, the car sharing system includes a car share device that performs wireless communication with the mobile terminal that functions as the vehicle key when code information is registered to the mobile terminal, and the car share device authenticates the code information through wireless communication with the mobile terminal and permits actuation of an on-board device of the vehicle with an electronic key system of the vehicle if the mobile terminal is operated after the code information is authenticated.

5. A valet key usable as a vehicle key when lending a vehicle to a third person, the valet key comprising:

a time monitor that monitors a remaining time of a reserved period during which the valet key is allowed to be used as the vehicle key; and a communication subject setter that switches a communication subject of the valet key between the vehicle and a mobile terminal, differing from the valet key, of a user of the vehicle in accordance with the remaining time of the reserved period, wherein when the remaining time of the reserved period is shorter than a threshold time, the communication subject setter sets the communication subject of the valet key to the mobile terminal to obtain permission to allow the valet key to be continuously used after the reserved period ends from the mobile terminal or an external device that communicates the mobile terminal, and wherein when the remaining time of the reserved period is greater than or equal to the threshold time, the valet key is allowed to be used as the vehicle key.

* * * * *